United States Patent [19]

Miyabayashi et al.

[11] Patent Number: 5,100,734
[45] Date of Patent: Mar. 31, 1992

[54] RUBBER LAMINATE

[75] Inventors: Toshio Miyabayashi, Chiba; Shinichiro Zen, Yokkaichi; Masayoshi Ichikawa, Ichinomiya; Hideyuki Fujiwara, Inazawa, all of Japan

[73] Assignees: Japan Synthetic Rubber Co., Ltd., Tokyo; Toyoda Gosei Co., Ltd., Aichi, both of Japan

[21] Appl. No.: 582,163

[22] Filed: Sep. 14, 1990

[30] Foreign Application Priority Data

Sep. 18, 1989 [JP] Japan .................................. 1-240969

[51] Int. Cl.$^5$ ...................... B32B 27/08; B32B 27/30
[52] U.S. Cl. ..................................... 428/515; 428/520; 428/522; 525/199
[58] Field of Search ....................... 428/515, 520, 522; 525/199

[56] References Cited

U.S. PATENT DOCUMENTS 4,822,654  4/1989  Takemura et al. ................. 428/36.8

Primary Examiner—Merrell C. Cashion, Jr.
Assistant Examiner—D. S. Nakarani
Attorney, Agent, or Firm—Oblon, Spivak, McClelland, Maier & Neustadt

[57] ABSTRACT

A flexible heat and gasoline resistant rubber laminate having high interlaminar adhesion consisting of a rubber layer (1) consisting a blend of (a) acrylic polymer derived from plasticized crosslinkable acrylates and an unsaturated epoxy group containing compound and (b) a vinylidene fluoride resin, laminated to a rubber layer (2) consisting essentially of crosslinked acrylic polymer derived from plasticized crosslinkable acrylates and unsaturated epoxy group consisting compounds.

31 Claims, No Drawings

RUBBER LAMINATE

This invention relates to a rubber laminate wherein a rubber layer consisting essentially of a blend of an acrylic rubber and a vinylidene fluoride resin and a rubber layer consisting essentially of acrylic rubber have been bonded to each other by vulcanization, and particularly to a rubber laminate suited for use as a material for hoses (e.g. fuel hoses or oil hoses for automobiles), shaped parts (e.g. diaphragm), etc.

In recent years, the atmosphere temperature in engine rooms of automobiles has become increasingly higher as a result of the measures taken for emission gas control and of the modification of engines, etc. for enhancing performances. Accordingly, the fuel rubber hoses arranged in the engine rooms are required to be composed of a material superior in heat resistance and durability.

Further, in recent automobiles, gasoline is oxidized at higher temperatures and comes to contain peroxides (such gasoline is called "sour gasoline"), and the sour gasoline is circulated in the fuel system. Thus, fuel rubber hoses for automobiles are currently required to have durabilities under various conditions which are severer than before.

As a material for formation of the inner portion of a fuel rubber hose, an acrylonitrilebutadiene rubber (referred to hereinafter as NBR) compound has been widely used because it is excellent in oil resistance and gasoline resistance and yet inexpensive.

The use of alcohol-added gasoline as an automobile fuel is under study in view of future supply situation of petroleum. In this connection, a rubber hose material is needed which has sufficient durability to alcohol-containing gasoline having a strong ability to swell rubbers.

As a material meeting such need, there is fluororubber (referred to hereinafter as "FKM"). FKM is superior in sour gasoline resistance and heat resistance, but is inferior in low-temperature characteristics and is expensive.

Besides the above materials, a blend rubber consisting of an acrylic rubber and a vinylidene fluoride resin has been developed as a material superior in sour gasoline resistance, heat resistance and alcohol-containing gasoline resistance (Japanese Patent Application Kokai No. 61-176,652).

It is further known to use the above blend rubber in the form of a single layer or a laminate structure with other resin such as NBR, acrylic rubber or the like for forming the inner portion of a fuel hose.

It is furthermore known to allow the inner portion of a fuel hose to have a double-layered structure in which the above-mentioned blend rubber is the inner most layer of the structure and NBR is the outer layer of the structure, and allow the NBR to contain a large amount of a plasticizer (Japanese Patent Application Kokai No. 63-218347).

In the above approach, since a large amount of plasticizer is present in NBR, the vulcanization-bonding between the blend rubber layer and the NBR layer is unable to give a sufficient interlaminar strength as required in practical application; moreover, the resulting fuel hose has insufficient flexibility at low temperatures.

Hence, it is desired to develop a laminate consisting of the above blend rubber layer and another material layer wherein the two layers have been strongly bonded to each other, which laminate gives excellent flexibility particularly at low temperatures when used as a hose.

The present inventors have made extensive study in order to achieve the above object. As a result, it has been found that a laminate consisting of a rubber layer of a blend of the above acrylic rubber and a vinylidene fluoride resin and a rubber layer consisting mainly of an acrylic rubber has improved flexibility particularly at low temperatures and that the two layers have been strongly bonded to each other in the laminate.

It has further been found that in the above laminate, the respective features of the blend rubber and the acrylic rubber are utilized effectively and tha the fuel hose adopting this laminate structure is superior in sour gasoline resistance, heat resistance and alcohol-containing gasoline resistance.

According to this invention, there is provided a rubber laminate wherein a first rubber layer and a second rubber layer have been bonded to each other by vulcanization, wherein the first rubber layer consists of a first rubber compound consisting essentially of 100 parts by weight of an acrylic blend rubber, 20–30 parts by weight of a plasticizer comprising at least a phosphate type plasticizer and, as a vulcanizing agent, a diamine carbamate compound and 1-orthotolylbiguanide, the acrylic blend rubber consisting of (I) an acrylic rubber composed of (A) 7.0–69.9% by weight of an alkyl acrylate,
(B) 30.0–70.0% by weight of an alkoxy-substituted alkyl acrylate,
(C) 0.1–3.0% by weight of an epoxy group-containing ethylenically unsaturated compound, and
(D) 0–20.0% by weight of other ethylenically unsaturated compound copolymerizable with the
(A), (B) and (C) components $$((A)+(B)+(C)+(D)=100\% \text{ by weight})$$

and (II) a vinylidene fluoride resin, the weight ratio of the acrylic rubber (I)/the vinylidene fluoride resin (II) in the acrylic blend rubber being 85/15 to 75/25, and the second rubber layer consists of (b) a second rubber compound consisting essentially of 100 parts by weight of an acrylic rubber (III) and 20–40 parts by weight of a plasticizer (the proportion of the plasticizer is equal to or larger than the proportion of the plasticizer in the rubber compound, the first acrylic rubber (III) being composed of (E) 1.0–49.9% by weight of an alkyl acrylate,
(F) 50.0–80.0% by weight of an alkoxy-substituted alkyl acrylate,
(G) 0.1–3.0% by weight of an epoxy group-containing ethylenically unsaturated compound, and
(H) 0–20.0% by weight of other ethylenically unsaturated compound copolymerizable with the (E), (F) and (G) components $$((E)+(F)+(G)+(H)=100\% \text{ by weight})$$

(the proportion of the (F) component is equal to or larger than the proportion of the (B) component in the acrylic rubber (I)).

In the blend rubber consisting of the acrylic rubber (I) and the vinylidene fluoride resin (II), the acrylic rubber (I) is composed of:

(A) 7.0–69.9% by weight of an alkyl acrylate,
(B) 30.0–70.0% by weight of an alkoxy-substituted alkyl acrylate,
(C) 0.1–3.0% by weight of an epoxy group-containing ethylenically unsaturated compound, and (D) 0–20.0% by weight of other ethylenically unsaturated compound copolymerizable with the (A), (B) and (C) components $((A)+(B)+(C)+(D)=100\%$ by weight).

The alkyl acrylate (A) is represented by general formula (i):

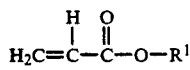 (i)

($R^1$ is an alkyl group of 1–18 carbon atoms), and includes, for example, methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate and n-octadecyl acrylate. Of these, preferable are methyl acrylate, ethyl acrylate, n-propyl acryalte and n-butyl acrylate. Methyl acrylate and ethyl acrylate are particularly preferable.

The alkoxy-substituted alkyl acrylate (B) is represented by general formula (ii):

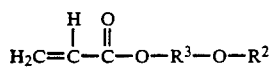 (ii)

($R^2$ is an alkyl group of 1–2 carbon atoms and $R^3$ is $C_{1-12}$alkylene group), and includes, for example, 2-methoxyethyl acrylate, 2-ethoxyethyl acrylate, 2-(n-propoxy)ethyl acryalte, 2-(n-butoxy)ethyl acrylate, 3-methoxypropyl acrylate, 3-ethoxypropyl acrylate, 2-(n-propoxy)propyl acrylate and 2-(n-butoxy)propyl acrylate. Of these preferable are 2-methoxyethyl acrylate and 2-ethoxyethyl acrylate. 2-Methoxyethyl acrylate is particularly preferable.

The epoxy group-containing ethylenically unsaturated compound (C) is preferably allyl glycidyl ether, glycidyl methacrylate or glycidyl acrylate.

As the said other ethylenically unsaturated compound (D), various compounds can be used, if necessary. There can be used, for example, carboxyl group-containing compounds such as acrylic acid, methacrylic acid, crotonic acid, 2-pentenoic acid, maleic acid, fumaric acid, itaconic acid and the like; methacrylates such as methyl methacrylate, octyl methacrylate and the like; alkyl vinyl ketones such as methyl vinyl ketone and the like; vinyl or allyl ethers such as vinyl ethyl ether, allyl methyl ether and the like; alkenyl aromatic compounds such as styrene, α-methylstyrene, chlorostyrene, vinyltoluene and the like; alkenyl cyanides such as acrylonitrile, methacrylonitrile and the like; alkenyl amides such as acrylamide, methacrylamide, N-methylolacrylamide and the like; olefins such as ethylene, propylene and the like; alkenyl halides such as vinyl chloridge, vinylidene chloride, vinyl fluoride, vinylidene fluoride and the like; vinyl acetate; and alkyl fumarates.

Of these, preferable are acrylonitrile, ethylene and vinyl acetate. Acrylonitrile is particularly preferable.

In the acrylic rubber (I), the proportion of the (A) component is 7.0–69.9% by weight, preferably 20–50% by weight. When the proportion of the (A) component exceeds the upper limit, the resulting rubber laminate is inferior in resistance to alcohol-containing gasoline. When the proportion is lower than the lower limit, the laminate is inferior in physical properties.

The proportion of the (B) component is 30.0–70.0% by weight, preferably 40–60% by weight. When the proportion of the (B) component exceeds the upper limit, the resulting rubber laminate is inferior in sour gasoline resistance. When the proportion is lower than the lower limit, the resistance to alcohol-containing gasoline becomes a problem.

The proportion of the (C) component is 0.1–3.0% by weight, preferably 0.4–1.5% by weight. When the proportion of the (C) component exceeds the upper limit, there appears scorch giving rise to a problem in vulcanizability. When the proportion is lower than the lower limit, no sufficient physical properties are obtained.

The (D) component is used if necessary as a copolymerizable component, and the proportion is not more than 20.0% by weight, preferably not more than 15% by weight.

The vinylidene fluoride resin (II) used in the acrylic blend rubber is a polyvinylidene fluoride; or a copolymer of vinylidene fluoride and at least one compound selected from hexafluoropropene, pentafluoropropene, trifluoroethylene, trifluorochloroethylene, tetrafluoroethylene, vinyl fluoride, perfluoro(methyl vinyl ether), perfluoro(propyl vinyl ether), vinyl acetate, ethylene, propylene, butadiene, styrene, acrylic acid esters, etc., wherein the content of vinylidene fluoride is at least 90 mole %, preferably at least 95 mole %. When the vinylidene fluoride resin has a vinylidene fluoride content of less than 90 mole the resulting acrylic blend rubber is inferior in resistance to gasoline, alcohol-containing gasoline and sour gasoline.

The vinylidene fluoride resin (II) preferably has a polymerization degree of 100–100,000, but this polymerization degree is not critical.

The weight ratio between the vinylidene fluoride resin (II) and the acrylic rubber (I) is such that the acrylic rubber (I)/the vinylidene fluoride resin (II) =85/15–75/25, preferably 80/20–75/25. When the amount of the vinylidene fluoride resin (II) exceeds the upper limit, the vulcanizate of the resulting blend rubber is inferior in flexibility. When the amount is lower than the lower limit, the blend rubber has no sufficient resistance to alcohol-containing gasoline and sour gasoline.

The first rubber compound comprising, as a main component, the acrylic blend rubber consisting of the acrylic rubber (I) and the vinylidene fluoride resin (II), must comprise 20–30 parts by weight, per 100 parts by weight of the acrylic blend rubber, of a plasticizer comprising at least a phosphate type plasticizer.

When the plasticizer comprises no phosphate type plasticizer, it is difficult to allow the first rubber compound to comprise a large amount of the plasticizer without causing bleeding and resultantly no sufficient low-temperature characteristics can be obtained.

The phosphate type plasticizer includes tri-(2-ethylhexyl) phosphate, triphenyl phosphate, tributoxyethyl phosphate, etc.

As the plasticizers other than the phosphate type plasticizer, there can be used phthalic acid derivatives such as ethyl phthalate, di-n-octyl phthalate and the like; adipic acid derivatives such as di-(2-ethylhexyl) adipate, di-(butoxyethoxyethyl) adipate, dibutyldiglycol adipate and the like; and polymeric plasticizers, such as polyester compounds, polyether compounds, polyesterether compounds, etc.

When the amount of the plasticizer in the first rubber compound is less than 20 parts by weight, low temperature characteristics are not sufficient. When the amount is more than 30 parts by weight, it adversely affects the bonding of the first rubber compound to the second rubber compound.

The first rubber compound must also comprise, as a vulcanizing agent, a diamine carbamate compound and 1-orthotolylbiguanide.

The use of diamine acarbamate compound and 1-orthotolylbiguanide in combination as a vulcanizing agent can improve the physical properties and the resistance to solvent-cracking growth of the acrylic blend rubber and further can ensure strong vulcanization-bonding of the first rubber compound to the second rubber compound.

The amount of the vulcanizing agent used is not critical. However, the amount of the diamine carbamate compound is preferably 0.3–2.0 parts by weight per 100 parts by weight of the acrylic blend rubber; and the amount of 1-orthotolylbiguanide is preferably 0.5–6.0 parts by weight per 100 parts by weight of the acrylic blend rubber.

The first rubber compound can optionally comprise, besides the above components, usual compounding agents such as processing aid, reinforcing agent, filler, softening agent, stabilizer and the like.

The rubber laminate of this invention can be produced by laminating a first rubber layer consisting of a first rubber compound comprising a specific acrylic rubber (I), a vinylidene fluoride resin (II), a specific plasticizer and a specific vulcanizing agent, and a second rubber layer consisting of a second rubber compound consisting essentially of an acrylic rubber (III) and a specific amount of a plasticizer.

The acrylic rubber (III) used in the second rubber compound is composed of:

(E) 1.0–49.9% by weight of an alkyl acrylate,
(F) 50.0–80.0% by weight of an alkoxy-substituted alkyl acrylate,
(G) 0.1–3.0% by weight of an epoxy group-containing ethylenically unsaturated compound, and
(H) 0–20.0% by weight of other ethylenically unsaturated compound copolymerizable with the (E), (F) and (G) components $((E)+(F)+(G)+(H)=100\%$ by weight).

The alkyl acrylate (E) is represented by the same general formula (i) as shown for the (A) component, and the alkoxy-substituted alkyl acrylate is represented by the same general formula (ii) as shown for the (B) component. As the (E) component and the (F) component, there can be used those compounds specifically mentioned for the (A) component and the (B) component, respectively. As the epoxy group-containing ethylenically unsaturated compound (G), there can be used those compounds specifically mentioned for the (C) component.

As the ethylenically unsaturated compound (H) copolymerizable with the (E), (F) and (G) components, there can be used those compounds specifically mentioned for the (D) component. Acrylonitrile is particularly preferable.

In the acrylic rubber (III) used as a main component of the second rubber compound it is important that the proportion of the alkoxy-substituted alkyl acrylate (F) be 50.0–80.0% by weight, preferably 50–70% by weight. When the proportion is less than 50.0% by weight the acrylic rubber (III) has no sufficient low-temperature characteristics and when the proportion exceeds 80.0% by weight, sour gasoline resistance and heat resistance are inferior.

It is important that the proportion of the (F) component in the acrylic rubber (III) is larger than the proportion of the (B) component in the acrylic rubber (I), and this is requisite in order for the laminate of this invention to have good flexibility at low temperatures.

The proportion of the epoxy-containing ethylenically unsaturated compound (G) is 0.1–3.0% by weight, preferably 0.4–1.5% by weight. When the proportion is less than 0.1% by weight, no sufficient vulcanization can be achieved, resulting in inferior physical properties. When the proportion exceeds 3.0% by weight, problems such as scorch, etc. arise to make the processing disadvantageous. Once the amounts of the (F) and (G) components are determined, the upper limit of the content of the alkyl acrylate (E) is determined automatically to be 49.9% by weight. When the content of the (E) component is less than 1.0% by weight, the adhesion to the rubber layer (I) becomes insufficient. The content of the (E) component is preferably 20–49.9% by weight.

The (H) component is optionally used in an amount of not more than 20.0% by weight, preferably not more than 10% by weight.

The plasticizer used in the second rubber compound includes phthalic acid derivative compounds such as diethyl phthalate, di-n-octyl phthalate and the like; isophthalic acid derivative compounds such as diisooctyl isophthalate and the like; tetrahydrophthalic acid derivative compounds such as di-(2-ethylhexyl) tetrahydrophthalate and the like; adipic acid derivative compounds such as di-(2-ethylhexyl) adipate, di-(butoxyethoxyethyl) adipate, butyldiglycol adipate and the like; azelaic acid derivative compounds such as di-(2-ethylhexyl) azelate and the like; sebacic acid derivative compounds such as di-(2-ethylhexyl) sebacate, di-n-butyl sebacate and the like; fatty acid derivative compounds such as diethylene glycol monolaurate and the like; phosphoric acid derivative compounds such as tri-(2-ethylhexyl) phosphate, triphenyl phosphate, tributoxyethyl phosphate and the like; glycol derivative compounds such as dibutyl methylenebisthioglycolate and the like; glycerine derivative compounds; epoxy derivative compounds; and so forth. The plasticizer further includes polymeric plasticizers such as polyester compounds, polyether compounds, polyetherester compounds and the like.

The proportion of the plasticizer used in the second rubber compound is 20–40 parts by weight per 100 parts by weight of the acrylic rubber (III). The proportion must be larger than the proportion of the plasticizer used in the first rubber compound.

When the proportion of the plasticizer is lower than 20 parts by weight per 100 parts by weight of the acrylic rubber (III), sufficient low-temperature characteristics cannot be obtained. When the proportion exceeds 40 parts by weight, the bonding strength of the second rubber layer consisting of the second rubber compound to the first rubber layer consisting of the first rubber compound is low. When the proportion of the plasticizer is smaller than the proportion of the plasticizer in the first rubber compound the resulting rubber laminate has insufficient low-temperature characteristics.

Similarly to the first rubber compound, the second rubber compound can further comprise, if necessary, usual compounding agents such as reinforcing agent, filler, softening agent, crosslinking agent, stabilizer and the like.

The method for bonding, by vulcanization, a first rubber layer consisting of a first rubber compound comprising, as a main component, an acrylic blend rubber consisting of an acrylic rubber (I) and a vinylidene fluoride resin (II) to a second rubber layer consisting of a second rubber compound comprising, as a main component, acrylic rubber (III), is not critical.

For example, when a rubber hose is produced, the individual rubber compounds are extruded from one extruder simultaneously, or from two extruders separately and laminated; then, the laminate is subjected to vulcanization-bonding under appropriate conditions (145°–170° C. × 30–90 minutes).

The thus obtained rubber laminate of this invention, as shown in the Examples stated hereinafter, has a significantly improved interlaminar strength between the first rubber layer mainly comprising the acrylic rubber (I) and the vinylidene fluoride resin (II) and the second rubber layer mainly comprising the acrylic rubber (III), and possess good flexibility at low temperatures.

This invention is described specifically below referring to Examples. However, this invention is not restricted to these Examples.

EXAMPLES 1–3 AND COMPARATIVE EXAMPLES 1–7

Six rubber compounds (a-1) to (a-6) were obtained by compounding a blend rubber of one of the three kinds of acrylic rubbers (I) shown in Table 1 (acrylic rubber 1, 2 or 3) and the vinylidene fluoride resin (II) shown in Table 1 (polyvinylidene fluoride) with other compounds as shown in Table 1 by a Banbury mixer according to the compounding recipe shown in Table 1.

Next, five rubber compounds (b-1) to (b-5) were obtained by compounding one of the three kinds of acrylic rubbers (III) shown in Table 2 (acrylic rubber 2, 4 or 5) or NBR with other compounds as shown in Table 2 by a Banbury mixer according to the compounding recipe shown in Table 2.

The rubber compounds (a-1) to (a-6) and the rubber compounds (b-1) to (b-5) variously were combined as shown in Table 3, to prepare test pieces of Examples 1-3 and Comparative Examples 1-7. In preparation of the test pieces, the compounds (a-1) to (a-6) and the compounds (b-1) to (b-5) were each passed through rolls (a 4-mm nip was used for test pieces for peeling test, and a 1.2-mm nip was used for test pieces for low-temperature tensile test and low-temperature bend test); the resulting sheets were put together and subjected to pressure (150 kgf/cm?) vulcanization at 160° C. for 60 minutes.

Each laminate was subjected to a peeling test by JIS K 6301, and the results are shown in Table 3.

Each laminate was also subjected to a low-temperature tensile test and a low-temperature bend test. The results are shown in Table 3.

The low-temperature tensile test and the low-temperature bend test were conducted as follows.

Low-temperature tensile test

A ring (radius: 15 mm, width: 2 mm) was punched from a laminate of 2 mm in thickness and subjected to a tensile test at −35° C. using an autograph, to measure the elongation at break. The low-temperature flexibility of the laminate was evaluated from this elongation at break.

Low-temperature bending test

A rectangular test piece of 6 mm in width and 115 mm in length was punched from a laminate of 2 mm in thickness, kept at a test temperature for 5 hours, and then wound around a mandrel of 28 mm in diameter. Thus, the lowest temperature was determined at which the test piece gave no breakage by repeating the above test at various temperatures. The low-temperature flexibility of the laminate was evaluated from this lowest temperature.

TABLE 1

Compounding recipes of rubber compounds (a)

| | a-1 | a-2 | a-3 | a-4 | a-5 | a-6 | a-7 |
|---|---|---|---|---|---|---|---|
| Blend rubber (part by weight) | | | | | | | |
| Acrylic rubber 1[*1] | 80 | | 60 | 80 | 80 | | |
| Acrylic rubber 2[*2] | | 80 | | | | | |
| Acrylic rubber 3[*3] | | | | | | 75 | |
| Acrylic rubber 6[*8] | | | | | | | 80 |
| Polyvinylidene fluoride | 20 | 20 | 40 | 20 | 20 | 25 | 20 |
| Carbon ISAF (part by weight) | 35 | 35 | 35 | 35 | 35 | 35 | 35 |
| Plasticizer 1[*4] (part by weight) | 15 | 15 | 15 | | 15 | 20 | 15 |
| Plasticizer 2[*5] (part by weight) | 15 | 15 | 15 | 10 | 15 | 5 | |
| Plasticizer 3[*6] (part by weight) | | | | 15 | | | |
| Stearic acid (part by weight) | 1 | 1 | 1 | 1 | 1 | 1 | 1 |
| Diak No. 1[*7] (part by weight) | 1 | 1 | 1 | 1 | | 1 | 1 |
| 1-Orthotolylbiguanide (part by weight) | 2 | 2 | 2 | 2 | | 2 | 2 |
| Ammonium benzoate (part by weight) | | | | | 2 | | |

Note:
[*1]Acrylic rubber 1: Ethyl acrylate/methoxyethyl acrylate/allyl glycidyl ether/acrylonitrile (39.2/50/0.8/10 wt. %) quadripolymer
[*2]Acrylic rubber 2: Ethyl acrylate/methoxyethyl acrylate/allyl glycidyl ether/acrylonitrile (69.2/20/0.8/10 wt. %) quadripolymer
[*3]Acrylic rubber 3: Ethyl acrylate/methoxyethyl acrylate/allyl glycidyl ether/acrylonitrile (29.2/60/0.8/10 wt. %) quadripolymer
[*4]Plasticizer 1: Tributoxyethyl phosphate
[*5]Plasticizer 2: Di(butoxyethoxyethyl) adipate
[*6]Plasticizer 3: Dioctyl phthalate
[*7]Diak No. 1: Hexamethylenediamine carbamate (a produt of DuPont)
[*8]Acrylic rubber 6: Methyl acrylate/methoxyethyl acrylate/allyl glycidyl ether (39.2/60/0.8 wt. %) terpolymer

TABLE 2

Compounding recipes of rubber compounds (b)

| | b-1 | b-2 | b-3 | b-4 | b-5 | b-6 |
|---|---|---|---|---|---|---|
| Rubber (part by weight) | | | | | | |
| Acrylic rubber 4[*1] | 100 | | 100 | | | |
| Acrylic rubber 2[*2] | | 100 | | | | |
| Acrylic rubber 5[*3] | | | | | 100 | |
| Acrylic rubber 7[*6] | | | | | | 100 |
| NBR[*4] | | | | 100 | | |
| Carbon FEF (part by weight) | | | | 70 | | |
| Carbon HAF (part by weight) | 100 | 100 | 100 | | 100 | 100 |
| Plasticizer 4[*5] (part by weight) | 35 | 35 | 15 | 35 | 35 | 35 |
| Ammonium benzoate (part by weight) | 2 | 2 | 2 | | 2 | 2 |
| Accelerator (part by weight) | | | | 2.5 | | |

TABLE 2-continued

Compounding recipes of rubber compounds (b)

| | Sample No. | | | | | |
|---|---|---|---|---|---|---|
| | b-1 | b-2 | b-3 | b-4 | b-5 | b-6 |
| Sulfur (part by weight) | | | | 0.5 | | |

Note:
*¹Acrylic rubber 4: Ethyl acrylate/methoxyethyl acrylate/allyl glycidyl ether/acrylonitrile (29.2/60/0.8/10 wt. %) quadripolymer
*²Acrylic rubber 2: Ethyl acrylate/methoxyethyl acrylate/allyl glycidyl ether/acrylonitrile (69.2/20/0.8/10 wt. %) quadripolymer
*³Acrylic rubber 5: Ethyl acrylate/methoxyethyl acrylate/allyl glycidyl ether/acrylonitrile (34.0/60/1.0/5 wt. %) quadripolymer
*⁴NBR: Acrylonitrile content = 35 wt. %
*⁵Plasticizer 4: TP-95 (a trade name of Thiokol Chemical Corporation for di-(butoxyethoxyethyl) adipate)
*⁶Acrylic rubber 7: Ethyl acrylate/butyl acrylate/methoxyethyl acrylate/allyl glycidyl ether/acrylonitrile (15/15/64/1/5 wt. %) quadripolymer

TABLE 3

| | Example | | | | |
|---|---|---|---|---|---|
| | 1 | 2 | 3 | 4 | 5 |
| Laminate | | | | | |
| Compound (a) | a-1 | a-6 | a-1 | a-7 | a-1 |
| Compound (b) | b-1 | b-1 | b-5 | b-1 | b-6 |
| Peeling test | | | | | |
| Bonding strength (kgf/cm²) | 18.0 | 17.2 | 16.8 | 16.5 | 17.5 |
| State of peeled sample | Sample broken | Sample broken | Sample broken | Sample broken | Sample broken |
| Low-temperature bending test Lowest temperature causing no breakage (°C.) | <−40 | <−40 | <−40 | <−40 | <−40 |
| Low-temperature tensile test Elongation at break at −35° C. (%) | 100 | 120 | 130 | 110 | 160 |

| | Comparative Example | | | | | | |
|---|---|---|---|---|---|---|---|
| | 1 | 2 | 3 | 4 | 5 | 6 | 7 |
| Laminate | | | | | | | |
| Compound (a) | a-1 | a-1 | a-1 | a-2 | a-5 | a-3 | a-4 |
| Compound (b) | b-2 | b-3 | b-4 | b-1 | b-1 | b-1 | b-1 |
| Peeling test | | | | | | | |
| Bonding strength (kgf/cm²) | 15.0 | 18.2 | 7.0 | 15.8 | 9.0 | 10.0 | 11.5 |
| State of peeled sample | Sample broken | Sample broken | Peeled at interface | Sample broken | Peeled at interface | Peeled at interface | Peeled at interface |
| Low-temperature bending test Lowest temperature causing no breakage (°C.) | −30 | −25 | −28 | −25 | <−40 | −34 | −32 |
| Low-temperature tensile test Elongation at break at −35° C. (%) | 30 | 20 | 40 | 25 | 100 | 30 | 40 |

It is appreciated from Table 3 that the rubber laminates of Examples 1-3 have good flexibility particularly at low temperatures and a significantly improved interlaminar strength.

This invention can provide a rubber laminate having excellent flexibility and a high interlaminar strength.

Since the blend rubber consisting of an acrylic rubber (I) and a vinylidene fluoride resin (II), used in the rubber layer (1) has excellent heat resistance and excellent resistance to sour gasoline and alcohol-containing gasoline, the rubber laminate of this invention provides a material highly suited for use in fuel hoses for automobiles.

What is claimed is:

1. A rubber laminate wherein a first rubber layer and a second rubber layer have been bonded to each other by vulcanization, wherein said first rubber layer consists of a first rubber compound consisting essentially of 100 parts by weight of an acrylic blend rubber, 20-30 parts by weight of a plasticizer comprising at least a phosphate plasticizer and, as a vulcanizing agent, a diamine carbamate compound and 1-orthotolylbiguanide, the said acrylic blend rubber consisting of (I) an acrylic rubber composed of (A) 7.0-6.9% by weight of an alkyl acrylate (B) 30.0-70.0% by weight of an alkoxy-substituted alkyl acrylate, (C) 0.1-3.0% by weight of an epoxy group containing ethylenically unsaturated compound, and (D) 0-20.0% by weight of other ethylenically unsaturated compound copolymerizable with the (A), (B) and (C) components, wherein the sum of A, B, C and D equals 100% by weight, and (II) a vinylidene fluoride resin, the weight ratio of I to II in the acrylic blend rubber being 85/15 to 75/25, and said second rubber layer consists of a second rubber compound consisting essentially of 100 parts by weight of an acrylic rubber (III) and 20-40 parts by weight of a plasticizer, the proportion of the plasticizer being equal to or larger than the proportion of the plasticizer in said first rubber compound, the acrylic rubber (III) being composed of (E) 1.0-49.9% by weight of an alkyl acrylate, (F) 50.0-80.0% by weight of an alkoxy-substituted alkyl acrylate, (G) 0.1-3.0% by weight of an epoxy group-containing ethylenically unsaturated compound, and (H) 0-20.0 by weight of other ethylenically unsaturated compound copolymerizable with the (E), (F) and (G) components, wherein the sum of E, F, G and H equals 100% by weight, the proportion of the (F) component being equal to or larger than the proportion of the (B) component in the acrylic rubber (I).

2. A rubber laminate according to claim 1, wherein the (A) component is an ester represented by general formula (i):

wherein R¹ is an alkyl group of 1-18 carbon atoms.

3. A rubber laminate according to claim 2, wherein the ester of general formula (i) is selected from the group consisting of methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate and n-octadecyl acrylate.

4. A rubber laminate according to claim 2, wherein the ester of general formula (i) is methyl acrylate or ethyl acrylate.

5. A rubber laminate according to claim 1, wherein the proportion of the (A) component is 20–50% by weight.

6. A rubber laminate according to claim 1, wherein the (B) component is an ester represented by general formula (ii):

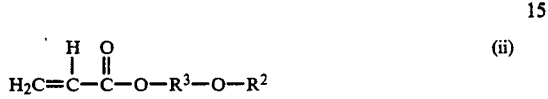

wherein $R^2$ is an alkyl group of 1–12 carbon atoms and $R^3$ is an alkylene group of 1–12 carbon atoms.

7. A rubber laminate according to claim 5, wherein the ester of general formula (ii) is selected from the group consisting of 2-methoxyethyl acrylate, 2-ethoxyethyl acrylate, 2(n-propoxy)-ethyl acrylate, 2-(n-butoxy)ethyl acrylate, 3-methoxypropyl crylate, 3-ethoxypropyl acrylate, 2-(n-propoxy)propyl acrylate and 2-(n-butoxy)propyl acrylate.

8. A rubber laminate according to claim 5, wherein the ester of general formula (ii) is 2-methoxyethyl acrylate.

9. A rubber laminate according to claim 1, wherein the proportion of the (B) component is 40–60% by weight.

10. A rubber laminate according to claim 1, wherein the (C) component is selected from the group consisting of allyl glycidyl ether, glycidyl methacrylate and glycidyl acrylate.

11. A rubber laminate according to claim 1, wherein the proportion of the (C) component is 0.4–1.5% by weight.

12. A rubber laminate according to claim 1, wherein the (D) component is selected from the group consisting of acrylonitrile, ethylene and vinyl acetate.

13. A rubber laminate according to claim 1, wherein the proportion of the (D) component is not more than 15% by weight.

14. A rubber laminate according to claim 7, wherein the vinylidene fluoride resin (II) is a polyvinylidene fluoride or a copolymer of vinylidene fluoride and at least one compound selected from the group consisting of hexafluoropropene pentafluoropropene, trifluoroethylene, trifluorochloroethylene, tetrafluoroethylene, vinyl fluoride, perfluoro(methyl vinyl ether), perfluoro(propyl vinyl ether), vinyl acetate, ethylene, propylene, butadiene, styrene and acrylic acid ester.

15. A rubber laminate according to claim 11, wherein the vinylidene fluoride resin contains at least 90 mole % of vinylidene fluoride.

16. A rubber laminate according to claim 1, wherein the acrylic rubber (I)/the vinylidene fluoride resin (II) weight ratio is 80/20–75/25.

17. A rubber laminate according to claim 1, wherein the phosphate plasticizer is selected from the group consisting of tri-(2-ethylhexyl)phosphate, trisphenyl phosphate and tributoxyethyl phosphate.

18. A rubber laminate according to claim 1, wherein the plasticizer in the first rubber compound further comprises a phthalic acid derivative compound or an adipic acid derivative compound.

19. A rubber laminate according to claim 7, wherein the vulcanizing agent is a combination of a diamine carbamate compound and 1-orthotolylbiguanide.

20. A rubber laminate according to claim 16, wherein the amount of the diamine carbamate compound is 0.3–2.0 parts by weight per 100 parts by weight of the acrylic blend rubber and the amount of 1-orthotolylbiguanide is 0.5–6.0 parts by weight per 100 parts by weight of the acrylic blend rubber.

21. A rubber laminate according to claim 1, wherein the (E) component is an ester represented by generally formula (i):

wherein $R^1$ is an alkyl group of 1–18 carbon atoms.

22. A rubber laminate according to claim 18, wherein the ester of general formula (i) is selected from the group consisting of methyl acrylate, ethyl acrylate, n-propyl acrylate, n-butyl acrylate, isobutyl acrylate, n-pentyl acrylate, sioamyl acrylate, n-hexyl acrylate, 2-methylpentyl acrylate, n-octyl acrylate, 2-ethylhexyl acrylate, n-decyl acrylate, n-dodecyl acrylate and n-octadecyol acrylate.

23. A rubber laminate according to claim 1, wherein the proportion of the (E) component is 20–49.9% by weight.

24. A rubber laminate according to claim 1, wherein the (F) component is an ester represented by general formula (ii):

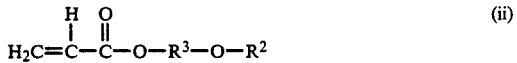

wherein $R^2$ is an alkyl group of 1–12 carbon atoms and $R^3$ is an alkylene group of 1–12 carbon atoms.

25. A rubber laminate according to claim 20, wherein the ester of general formula (ii) is selected from the group consisting of 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate and 2-(n-butoxy) propyl acrylate.

26. A rubber laminate according to claim 1, wherein the proportion of the (F) component is 50–70% by weight.

27. A rubber laminate according to claim 1, wherein the (G) component is selected from the group consisting of allyl glycidyl ether, glycidyl methacrylate and glycidyl acrylate.

28. A rubber laminate according to claim 7, wherein the proportion of the (G) component is 0.4–1.5% by weight.

29. A rubber laminate according to claim 14, wherein the (H) component is acrylonitrile.

30. A rubber laminate according to claim 1, wherein the proportion of the (H) component is 0–10% by weight.

31. A rubber laminate according to claim 1, wherein the plasticizer in the second rubber compound is selected from the group consisting of a phthalic acid derivative compound, a tetrahydrophthalic acid derivative compound, an adipic acid derivative compound, an azelaic acid derivative compound, a sebacic acid derivative compound, a fatty acid derivative compound, a phosphoric acid derivative compound, a glycerine derivative compound and an epoxy derivative compound.

* * * * *